(12) United States Patent
Ouyang et al.

(10) Patent No.: US 9,965,908 B2
(45) Date of Patent: May 8, 2018

(54) MOBILE ACCESS CONTROL SYSTEM AND METHOD

(71) Applicant: Honeywell International Inc., Morristown, NJ (US)

(72) Inventors: Li Ouyang, Shanghai (CN); Sheng Yi, Shanghai (CN); Chen Chen, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days. days.

(21) Appl. No.: 15/349,068

(22) Filed: Nov. 11, 2016

(65) Prior Publication Data

US 2017/0061717 A1    Mar. 2, 2017

Related U.S. Application Data

(63) Continuation of application No. 14/152,342, filed on Jan. 10, 2014, now Pat. No. 9,524,594.

(51) Int. Cl.
*G05B 19/00* (2006.01)
*G05B 23/00* (2006.01)
(Continued)

(52) U.S. Cl.
CPC ...... *G07C 9/00111* (2013.01); *G07C 9/00103* (2013.01); *G07C 9/00309* (2013.01);
(Continued)

(58) Field of Classification Search
CPC ............ G07C 9/00111; G07C 9/00309; G07C 2009/00793; H04L 9/14; H04L 9/30; H04L 2209/805
See application file for complete search history.

(56) References Cited

U.S. PATENT DOCUMENTS

2002/0116268 A1* 8/2002 Fukuda ................. G06Q 30/02
709/201
2005/0060555 A1* 3/2005 Raghunath ......... G07C 9/00309
713/186
(Continued)

FOREIGN PATENT DOCUMENTS

CN         1606762 A    4/2005
CN      201859491 U    6/2011
(Continued)

OTHER PUBLICATIONS

Extended European Search Report, dated May 15, 2015, corresponding to European Application No. EP 15 15 0349.
(Continued)

*Primary Examiner* — Quang D Pham
(74) *Attorney, Agent, or Firm* — Husch Blackwell LLP

(57) ABSTRACT

Systems and methods of accessing a control system are provided. Some methods can include a mobile device transmitting a wireless entry request signal to a tag device, the wireless entry request signal including a mobile device identifier and a system identifier, upon receipt of the wireless entry request signal, the tag device comparing the mobile device identifier and the system identifier with a list of authorized identifiers, when the tag device determines that both the mobile device identifier and the system identifier match an entry in the list of authorized identifiers, the tag device transmitting a data file to the mobile device, the data file containing a door identifier of a door, and the mobile device transmitting an access request signal to a controller for use by the controller in unlocking the door, the access request signal including the mobile device identifier, the door identifier, and the system identifier.

11 Claims, 3 Drawing Sheets

(51) Int. Cl.

| | | |
|---|---|---|
| G06F 7/00 | (2006.01) | |
| G06F 7/04 | (2006.01) | |
| G06K 19/00 | (2006.01) | |
| G08B 29/00 | (2006.01) | |
| G08C 19/00 | (2006.01) | |
| H04B 1/00 | (2006.01) | |
| H04B 1/38 | (2015.01) | |
| H04B 3/00 | (2006.01) | |
| H04Q 1/00 | (2006.01) | |
| H04Q 9/00 | (2006.01) | |
| G07C 9/00 | (2006.01) | |
| H04L 9/14 | (2006.01) | |
| H04L 9/30 | (2006.01) | |

(52) U.S. Cl.
CPC ............ *G07C 9/00571* (2013.01); *H04L 9/14* (2013.01); *H04L 9/30* (2013.01); *G07C 2009/00793* (2013.01); *H04L 2209/24* (2013.01); *H04L 2209/805* (2013.01)

(56) References Cited

U.S. PATENT DOCUMENTS

| | | | |
|---|---|---|---|
| 2006/0164208 A1* | 7/2006 | Schaffzin | G07C 9/00182 340/5.64 |
| 2006/0186994 A1* | 8/2006 | Lin | G08B 13/1418 340/5.74 |
| 2007/0063836 A1 | 3/2007 | Hayden et al. | |
| 2007/0074024 A1* | 3/2007 | Cheong | G06Q 30/02 713/171 |
| 2008/0301307 A1* | 12/2008 | Son | G06F 17/30876 709/228 |
| 2010/0007496 A1* | 1/2010 | Orlassino | H04W 4/02 340/572.1 |
| 2010/0060432 A1* | 3/2010 | van Niekerk | G06K 7/0008 340/10.3 |
| 2010/0148919 A1 | 6/2010 | Roberts et al. | |
| 2010/0201482 A1* | 8/2010 | Robertson | G07C 9/00111 340/5.61 |
| 2011/0227693 A1* | 9/2011 | Ekus | G07C 9/00111 340/3.1 |
| 2011/0258443 A1* | 10/2011 | Barry | G06F 21/31 713/168 |
| 2012/0077468 A1* | 3/2012 | Fan | G07C 9/00309 455/414.1 |
| 2012/0280790 A1* | 11/2012 | Gerhardt | G07C 9/00309 340/5.61 |
| 2013/0088331 A1* | 4/2013 | Cho | H04Q 9/00 340/10.1 |
| 2013/0169461 A1 | 7/2013 | Sienko | |
| 2013/0214898 A1* | 8/2013 | Pineau | G06F 21/32 340/5.6 |
| 2013/0221094 A1* | 8/2013 | Smith | G07C 9/00309 235/382 |
| 2013/0222583 A1* | 8/2013 | Earnshaw | H04N 21/47202 348/143 |
| 2013/0303085 A1* | 11/2013 | Boucher | H04W 4/008 455/41.1 |
| 2013/0331027 A1* | 12/2013 | Rose | H04W 12/06 455/41.1 |
| 2014/0091902 A1* | 4/2014 | Domsten | G06Q 10/08 340/5.8 |
| 2014/0136652 A1* | 5/2014 | Narayanaswami | H04L 67/02 709/217 |
| 2014/0145823 A1* | 5/2014 | Aase | G07C 9/00309 340/5.61 |
| 2014/0240087 A1* | 8/2014 | Liu | G07C 9/00103 340/5.54 |
| 2014/0255036 A1* | 9/2014 | Jovicic | H04B 10/116 398/115 |
| 2014/0266585 A1* | 9/2014 | Chao | G07C 9/00111 340/5.61 |
| 2015/0038080 A1* | 2/2015 | Stroud | H04B 5/0031 455/41.1 |
| 2015/0172925 A1* | 6/2015 | Leppanen | H04W 12/04 726/7 |
| 2015/0199684 A1 | 7/2015 | Maus et al. | |
| 2015/0279130 A1 | 10/2015 | Robertson et al. | |
| 2015/0279132 A1 | 10/2015 | Perotti | |
| 2015/0287256 A1 | 10/2015 | Davis | |

FOREIGN PATENT DOCUMENTS

| | | |
|---|---|---|
| CN | 102479397 A | 5/2012 |
| CN | 103229214 A | 7/2013 |
| CN | 103413109 A | 11/2013 |
| EP | 1 536 306 A1 | 6/2005 |

OTHER PUBLICATIONS

First Office Action and Search Report for corresponding CN patent application 201510086139.7, dated Oct. 25, 2016.
English-language translation of the First Office Action and Search Report for corresponding CN patent application 201510086139.7, dated Oct. 25, 2016.
English-language translation of abstract for CN 1606762 A, dated Apr. 13, 2005.
English-language translation of abstract for CN 201859491 U, dated Jun. 8, 2011.
English-language translation of abstract for CN 102479397 A, dated May 30, 2012.
English-language translation of abstract for CN 103229214 A, dated Jul. 31, 2013.
Examination report from corresponding EP patent application 15150349,7, dated Jun. 21, 2017.
English-language translation of CN patent publication 103413109, dated Nov. 27, 2013.

\* cited by examiner

MOBILE ACCESS CONTROL SYSTEM AND METHOD

CROSS-REFERENCE TO RELATED APPLICATIONS

This application is a continuation of and claims the benefit of the filing date of U.S. application Ser. No. 14/152,342 filed Jan. 10, 2014.

FIELD

The field relates to secured areas and, more particularly, to methods of accessing secured areas.

BACKGROUND

Security systems used for the protection of secured areas are known. Such systems typically rely upon a fence or barrier around a secured area with one or more portals (e.g., doors, windows, etc.) that allow access by authorized persons into the secured area.

Each of the portals may have a sensor (e.g., a limit switch) connected to the door or window that detects opening of the door or window by an intruder. Sensors may be monitored by a local control panel. Upon activation of one of the sensors, the control panel may activate a local alarm that notifies persons within the secured area of a threat.

The control panel may include a user interface that controls arming and disarming of a security system. The user interface may be located on the control panel or near an entrance to the secured area.

In order to avoid false alarms, the control panel may have a built-in delay that begins after detection of opening of the door or window and before activation of the alarm. This delay may be used by an authorized person to disarm the security system through the user interface.

In more sophisticated security systems, the authorized user may use an access card in conjunction with a card reader to both open the door and deactivate the security system. However, access cards may be duplicated and card readers are subject to damage by criminals. Accordingly, better methods are needed to allow access into secured areas by authorized persons.

DETAILED DESCRIPTION OF AN ILLUSTRATED EMBODIMENT

Figure 1:
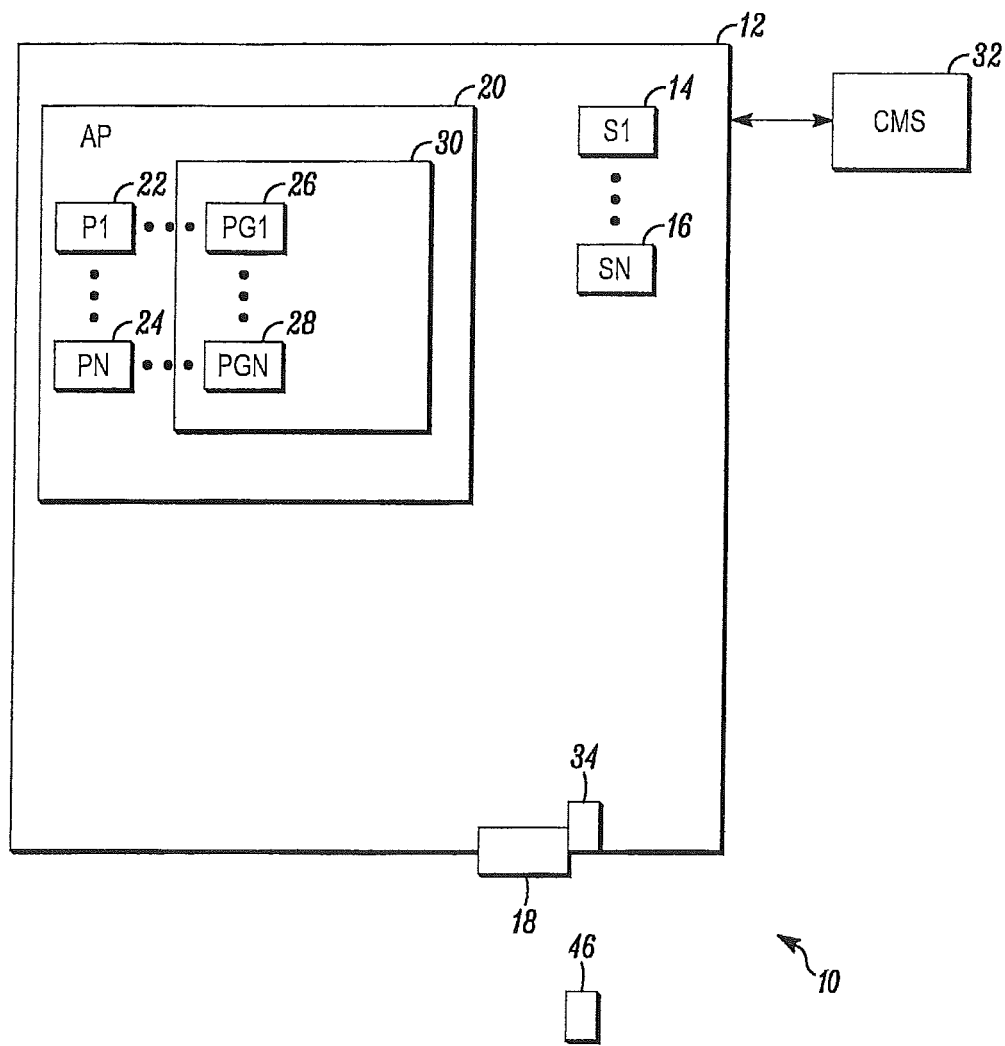
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof as well as the best mode of practicing the same. No limitation to the specific embodiment illustrated is intended.

FIG. 1 is a security system 10 shown generally in accordance with an illustrated embodiment. Included within the security system may be a number of sensors 14, 16 that protect a secured area 12.

Located along a periphery of the secured area may be one or more doors 18 that provide access into and egress from the secured area by authorized persons. The doors may be monitored by one or more of the sensors.

The sensors may be monitored by a control (or alarm) panel 20. Upon activation of one of the sensors, the control panel may send an alarm message to a central monitoring station 32. The central monitoring station may respond by summoning the police.

Included within the control panel may be one or more processor apparatuses (processors) 22, 24 each operating under control of one or more computer programs 26, 28 loaded from a non-transient computer readable medium (memory) 30. As used herein, reference to a step of a program is also reference to the processor that executed that step.

During normal operation, one or more alarm processors of the alarm panel may monitor the status of each of the sensors. Upon activation of the one of the sensors, the alarm processor may compose the alarm message including an identifier of the one of the sensors activated, an identifier of the security system, and a time of activation. The composed message, in turn, is sent to the central monitoring station.

The alarm panel may also control access by authorized persons into the secured area via the doors. An access processor of the alarm panel (or one of the doors) may control one or more access control subsystems 34 located on or associated with the one or of the doors. One of the features of the access control subsystem is a transceiver near the one of the doors that detects a portable wireless device 46 carried by an authorized person. The access processor may receive information through the transceiver of the subsystem from the wireless device that confirms the identity of the authorized person and the one of the doors. Upon confirming the identity, the access processor may activate an electrically operated lock on the one of the doors in order to open the one of the doors. The access processor may also cancel any alarm activated by opening of the one of the doors.

Figure 2:
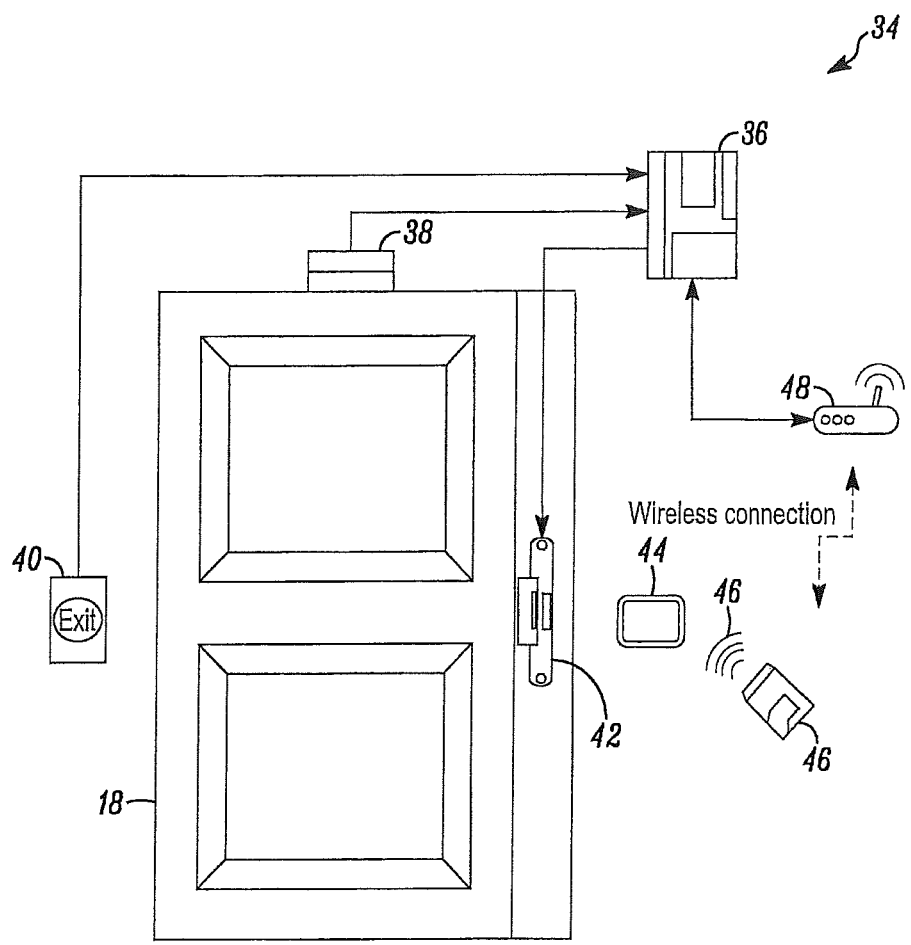
FIG. 2 is a block diagram of a door of the system of FIG. 1.
Figure 3:
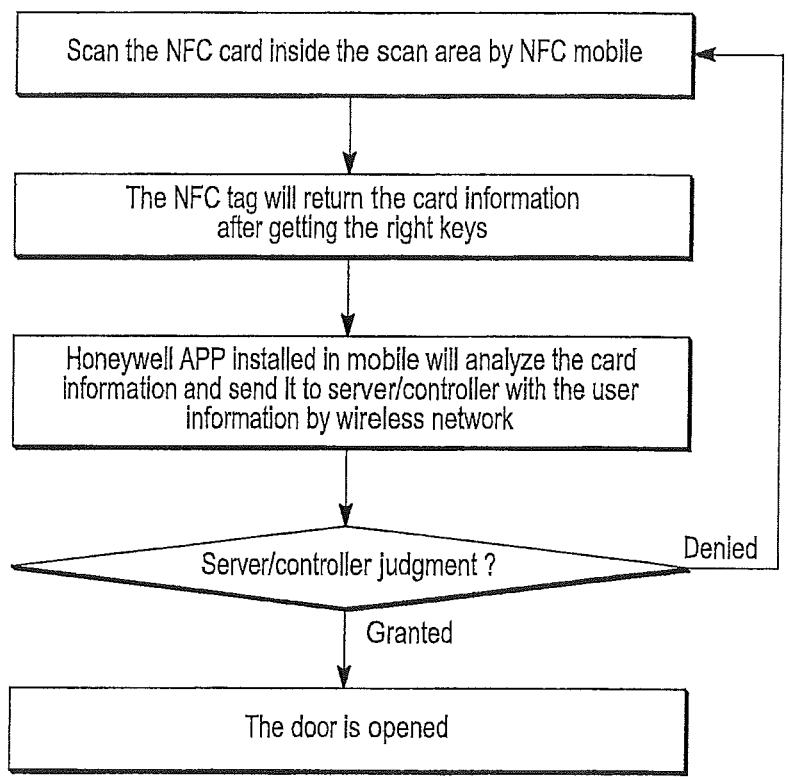
FIG. 3 is a flow chart of steps that may be used by the system of FIG. 1.

FIG. 2 is a simplified block diagram of a door and an access control subsystem. The access control subsystem may include a local field control panel 36, a door sense switch 38, an exit button 40, an electronic strike lock control 42, an NFC tag 44, an NFC mobile 46, and a wireless access point 48. In this regard, the field control panel 36 may be incorporated into the alarm panel 20 of FIG. 1 or may be a separate panel as shown in FIG. 2. Similarly, the door sense switch 38 detects opening of the door and may be a separate sensor or may be one of the group of sensors 14, 16 shown in FIG. 1.

The electronic strike lock control may be an electrically operated lock. Activation of the electronic strike lock control allows persons to enter (or exit) a secured area.

The exit button may be located inside the secured area and may be used by authorized persons inside the secured area in order to exit. Activation of the exit button may activate the electrically operated lock.

The NFC tag may be a near field communication (NFC) tag as defined by the NFC forum. Alternatively, the NFC tag may be a radio frequency identification (RFID) tag. Alternatively, the NFC tag may be an RFID card that uses an NFC protocol. The NFC tag may be embedded or otherwise hidden within a door frame or other location proximate the door.

The NFC tag contains a data file including a coded identifier of the door and of a security system. The identifier of the security system may be an IP address. The data file is encrypted using one or more public and private keys.

The NFC mobile may be any portable wireless device capable of activating the NFC tag. The NFC mobile may be a cellphone, smartphone, PDA, or portable computer.

Under the illustrated embodiment, the portable wireless device includes an access program executing on an access request processor within the portable wireless device. The access program (processor) operates to exchange information with the access control subsystem in order to gain access to the secured area. To initiate access into the secured area, a user may activate an access button shown on a screen of the portable device.

In response, the portable wireless device transmits a wireless entry request message or signal 46 to the NFC tag (card). The wireless signal may include an identifier of the portable wireless device or an identifier of the portable wireless device and the security system. The signal is received by the NFC card and provides power to the NFC card. In one preferred embodiment, the NFC card simply transmits the encrypted data file back to the portable wireless device. Under a more preferred embodiment, a processor within the NFC card compares the identifier of the security system or the identifier of the security system and the user with one or more authorized identifiers. If the identifier(s) match, then the NFC card transmits the encrypted data file back to the portable wireless device.

Under one particularly preferred embodiment, the portable wireless device operates under a reader/writer mode as defined by the NFC forum. Under this embodiment, the entry request message and return of the encrypted data file may occur under a predetermined NFC protocol of request and response messages defined by the specifications of the NFC forum.

Located within the portable wireless device is a file containing the one or more public and private keys that may be used by the access request processor or a separate decoding processor within the portable wireless device to decode the received encrypted data file. The access request processor decrypts the data file using the one or more public and private keys to recover the identifier of the door and the identifier of the security system.

Once the access request processor has the identifier of the door and the identifier of the security system, a communication processor of the portable wireless device composes an access request including the identifier of the user, the identifier of the door, and the identifier of the security system. The portable wireless device transmits the access request to a corresponding access verification processor of the local field control panel 36 (or 20) through the wireless access point.

The access verification processor may decode the access request and first confirm that the identifier of the security system received from the portable wireless device matches that of the security system and that the identifier of the user corresponds to an authorized user of the security system. The access verification processor may do this by comparing the identifier of the user with a list of authorized persons located within a memory of the access verification processor. The access verification processor may also confirm that the door identified by the identifier of the door is part of the security system by matching the identifier of the door with a list of door identifiers.

Upon confirming the identifiers of the security system and the door and that the user of the portable wireless device is the authorized user, the access verification processor may compose and send an activating message to the strike lock control 42. Upon receipt of the activating message, the strike lock control may open the door, and the user may enter the secured area.

In general, the system includes an access door of a secured area, a lock that controls access into the secured area through the door, a controller coupled to the lock, and a portable wireless device proximate the door, wherein the portable wireless device wirelessly retrieves an identifier from the door and wirelessly transfers the identifier of the door and a personal identifier of a person carrying the portable wireless device to the controller, and wherein the controller compares the received personal identifier with a list of identifiers of persons authorized to enter the secured area, determines that the received personal identifier matches an identifier of the list of identifiers, and activates the lock, thereby allowing physical entry by the person into the secured area.

Alternatively, the system includes a security system that protects a secured area, an access door of the secured area, a lock that controls access into the secured area through the door, a controller coupled to the lock, a radio frequency identification (RFID) card permanently located near the access door containing an identifier of the door, a portable wireless device, and a wireless access port, wherein the portable wireless device wirelessly recovers the identifier of the door directly from the RFID card, wherein the portable wireless device wirelessly transfers the identifier of the door and a personal identifier of a person carrying the portable wireless device to the controller through the wireless access port, and wherein the controller compares the received personal identifier with a list of identifiers of persons authorized to enter the secured area, determines that the received personal identifier matches an identifier of the list of identifiers, and activates the lock, thereby allowing physical entry by the person into the secured area.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A near field communication (NFC) tag device attached to an associated door of a security system, the NFC tag device comprising:
   a transceiver;
   a memory device that stores a door identifier of the associated door of the security system and a list of authorized identifiers;
   a programmable processor; and
   executable control software stored on a non-transitory computer readable medium,
   wherein the programmable processor and the executable control software receive, via the transceiver, a wireless entry request signal from an NFC mobile device carried by a person, the wireless entry request signal including an NFC mobile device identifier of the NFC mobile device and a system identifier of the security system, wherein the programmable processor and the executable control software compare the NFC mobile device identifier of the NFC mobile device and the system identifier of the security system with the list of authorized identifiers, wherein, if both the NFC mobile device identifier of the NFC mobile device and the system identifier of the security system match an entry in the list of the authorized identifiers, then the programmable processor and the executable control software transmit an encrypted data file including the system identifier of the security system and the door identifier of the associated door to the NFC mobile device, wherein the NFC mobile device decodes the system identifier of the security system and the door identifier of the associated door from the encrypted data file and wirelessly transmits an access request including a user identifier of the person carrying the NFC mobile device, the door identifier of the associated door, and the system identifier of the security system to an access processor to unlock the associated door, and wherein the access processor decodes the access request, confirms the person carrying the NFC mobile device is an authorized person by comparing the user identifier of the person carrying the NFC mobile device with a list of identifiers of persons authorized to enter the associated door of the security system and determining that the user identifier of the person carrying the NFC mobile device matches an identifier in the list of identifiers of persons authorized to enter the associated door of the security system, confirms the associated door being part of the security system by matching the door identifier of the associated door with a list of door identifiers, and responsive thereto, sends an activating message to a lock to activate the lock to allow physical entry by the person carrying the mobile device into a secured area of the associated door.

2. The NFC tag device of claim 1 further comprising a radio frequency identification (RFID) tag device.

3. The NFC tag device of claim 1 wherein the system identifier of the security system includes an IP address of the security system.

4. The NFC tag device of claim 1 wherein the wireless entry request signal provides power to the NFC tag device.

5. A near field communication (NFC) mobile device carried by a person and used to unlock an associated door of a security system, the NFC mobile device comprising:
a transceiver;
a memory device of the NFC mobile device that stores an NFC mobile device identifier of the NFC mobile device and a system identifier of a security system;
a programmable processor; and
executable control software stored on a non-transitory computer readable medium,
wherein the programmable processor and the executable control software transmit, via the transceiver, a wireless entry request signal to an NFC tag device attached to the associated door of the security system, the wireless entry request signal including the NFC mobile device identifier of the NFC mobile device and the system identifier of the security system,
wherein, responsive to the NFC tag device comparing the NFC mobile device identifier of the NFC mobile device and the system identifier of the security system received from the NFC mobile device with a list of authorized users stored in a memory of the NFC tag device and both the NFC mobile device identifier of the NFC mobile device and the system identifier of the security system matching an entry in the list of the authorized identifiers, the NFC tag device transmits an encrypted data file including the system identifier of the security system and the door identifier of the associated door to the NFC mobile device, wherein the programmable processor and the executable control software receive, via the transceiver, the encrypted data file from the NFC tag device, decode the system identifier of the security system and the door identifier of the associated door from the encrypted data file, and wirelessly transmit an access request including a user identifier of the person carrying the NFC mobile device, the door identifier of the associated door, and the system identifier of the security system to an access processor to unlock the associated door, and wherein the access processor decodes the access request, confirms the person carrying the NFC mobile device is an authorized person by comparing the user identifier of the person carrying the NFC mobile device with a list of identifiers of persons authorized to enter the associated door of the security system and determining that the user identifier of the person carrying the NFC mobile device matches an identifier in the list of identifiers of persons authorized to enter the associated door of the security system, confirms the associated door being part of the security system by matching the door identifier of the associated door with a list of door identifiers, and responsive thereto, sends an activating message to a lock to activate the lock to allow physical entry by the person carrying the NFC mobile device into a secured area of the associated door.

6. The NFC mobile device of claim 5 wherein the system identifier of the security system includes an IP address of the security system.

7. The NFC mobile device of claim 5 wherein the memory device of the NFC mobile device stores an encryption file, the encryption file including one or more private or public encryption keys, and wherein the programmable processor and the executable control software use the one or more private or public encryption keys to decrypt the encrypted data file and recover the door identifier of the associated door and the system identifier of the security system from the NFC tag device.

8. The NFC mobile device of claim 5 wherein the wireless entry request signal provides power to the NFC tag device.

9. The NFC mobile device of claim 5 further comprising a cellular phone, a smart phone, a personal digital assistant, or a portable computer.

10. The NFC mobile device of claim 5 wherein the programmable processor and the executable control software transmit the wireless entry request signal responsive to receiving a user input from the person carrying the NFC mobile device.

11. The NFC mobile device of claim 5 wherein the programmable processor and the executable control software transmit the access request to the access processor via a wireless access point.

* * * * *